United States Patent [19]
Leymann et al.

[11] Patent Number: 6,012,094
[45] Date of Patent: Jan. 4, 2000

[54] METHOD OF STRATIFIED TRANSACTION PROCESSING

[75] Inventors: Frank Leymann, Aidlingen; Dieter Roller, Schönaich, both of Germany

[73] Assignee: International Business Machines Corporation, Armonk, N.Y.

[21] Appl. No.: 08/884,954

[22] Filed: Jun. 30, 1997

[30] Foreign Application Priority Data

Jul. 2, 1996 [EP] European Pat. Off. .............. 96110649

[51] Int. Cl.[7] .............................. G06F 13/42; G06F 13/14
[52] U.S. Cl. ........................... 709/230; 709/101; 707/202
[58] Field of Search .............................. 707/10, 201, 101, 707/102, 8, 10.4; 714/2, 16, 20, 19, 15; 711/115, 163; 709/101, 237, 303, 230, 201, 243, 300

[56] References Cited

U.S. PATENT DOCUMENTS 5,170,480  12/1992  Mohan et al. .......................... 707/201
5,247,664   9/1993  Thompson et al. ....................... 707/10

FOREIGN PATENT DOCUMENTS 2263988  11/1993  United Kingdom .
9420903   9/1994  WIPO .

*Primary Examiner*—Daniel H. Pan
*Attorney, Agent, or Firm*—Timothy M. Farrell; David J. Kappos

[57] ABSTRACT

The present invention relates to a method of computerized transaction of a collection of a multitude of potentially distributed transactions ensuring the atomicity of the collection of transactions. Besides offering atomic processing behavior the invention optimizes the communication traffic for the coordination of said transactions and the concurrency behavior and throughput of said collection of transactions. The fundamental concept of the current invention for the processing of a collection of potentially distributed transactions encompassed by a global transaction is based on the approach to split the collection of transactions into groups of transactions. Each of the groups is called a transactional stratum or stratum for short. Each stratum is processed and synchronized via an atomic-commit-protocol, thus guaranteeing an ACID processing outcome for each individual stratum. The global transaction, hence structured as a resulting collection of groups of transactions, i.e. as collection of strata, is processed as a set of chained strata according the principles of chained transaction processing. The chained strata execution guarantees an atomic execution of the global transaction.

13 Claims, 5 Drawing Sheets

```
1 BEGIN_WORK();
2    <any sequence to calls to Resource Managers>
3    <any other activity within the Commit-Scope>
4 if (success)
5    COMMIT_WORK();
6 else
7    ROLLBACK_WORK();
```

FIG. 1

METHOD OF STRATIFIED TRANSACTION PROCESSING

TECHNICAL FIELD

The present invention relates to a method of computerized transaction processing.

More particularly, the invention relates to the computerized processing of a collection of a multitude of potentially distributed transactions ensuring the atomicity of the collection of transactions.

BACKGROUND OF THE INVENTION

A transaction, also called a transactional application, comprises a sequence of operations that changes recoverable resources and data such as a database from one consistent state into another. A transaction processing system guarantees that if a transaction executes some updates against recoverable resources and data, and if a failure occurs before the transaction reaches its normal termination or an interim point of consistency, then those updates will be undone (roll-back). When a new point of consistency has been reached and all updates made by the transaction must be made permanent, the transaction commits.

To fulfill this transaction recovery guarantee, the system must be able to remember across system outages both transactions in progress and their update actions, so that their effect on recoverable data can be properly reflected when the system is restarted. In general the system maintains a log, recorded and maintained by a log manager, of each transaction's progress and changes to the resources and data in order to fulfill the transaction recovery guarantee. The log data, known as log records, can be examined to ensure that either the transaction's committed actions are reflected in the database or were undone. When the log records include actual data, they can also be used to reconstruct data which has been damaged or lost, such as by the failure of a storage device. The log can be thought of as an ever growing sequential file.

The log is permanently stored on stable storage such as a disk file, which remains intact and available across system failures. Log records are first written to temporary, volatile log files buffers in the computer's memory, and then transferred to stable storage at certain times (for example when a transaction is committed).

Locking, supported by a lock manager, is used to control simultaneously executing (i.e. concurrent) transactions' access to shared resources and shared data, and in particular is used to prevent concurrent transactions from inconsistently modifying the same resources and data. Appropriate use of locking can guarantee a transaction that the resource it manipulates and the data it reads is in a consistent state and that the resource and data does not contain uncommitted updates of other transactions.

The recoverable resources and data the transaction is manipulating further may be supported by a resource manager. A resource manager is a subsystem that manages some transactional objects of a certain type. The resource manager typically offers services to applications or other resource managers, which might be available in the overall system. A transactional database system, a transaction queue manager, a transactional session manager and so forth all can act as a resource manager.

A transaction manager administrates, manages and coordinates the flow of the multitude of concurrently processing transactions through the computer system. It orchestrates the commit and undo, i.e. rollback, of transactions as well as the recovery of objects, resource managers, or sites after they fail. Above mentioned consistency requirement for a certain transaction and for all other concurrently processing transaction in the local or distributed transaction system is more accurately expressed as the ACID requirement. Actually ACIDicity is a combination of four different sub-requirements:

atomicity
    A transactions's changes to the state of the overall system are atomic; either all happen or none happen. These changes include all changes to resources including database changes, messages, actions on transducers and so forth.

consistency
    A transaction is a correct transformation of the system state. The actions taken as a group do not violate any of the integrity constraints associated with the state. This requires that the transaction be a correct program.

isolation
    Even though transactions execute concurrently, it appears to each transaction T, that other transactions execute either before T or after T, but not both.

durability
    Once a transaction completes successfully and it commits its activities, its changes to the state survive failures, i.e. the state changes became permanent.

Within computer science mechanisms are known to ensure atomicity of global transactions. Details can be found in "J. Gray, A. Reuter, Transaction Processing: Concepts and Techniques, Morgan Kaufmann Publishers, San Francisco (Calif.)" for instance. The focus is in so-called Atomic Commit Protocols (ACP) which are synchronous protocols allowing collections of transactions to reach a common consistent transactional outcome i.e. a consistent system state (i.e. either commit or abort). The most wide-spread exploited ACP is the so-called Two-Phase-Commit (2PC) protocol which has been implemented and used many time in a large number of different commercial systems.

Due to its importance the 2PC has been standardized by industry consortia: For instance the procedural variant has been standardized by X/OPEN; its details can be found in "X/OPEN Guide, Distributed transaction Processing Reference Model (Version 2), X/OPEN Company Ltd., U.K. 1993". The object-oriented variant has been standardized by the Object-Management-Group (OMG); its details can be found in "Object Management Group, Object Transaction Services (OTS), OMG Document TC 94.8.4 (1994)". Many standard compliant implementations of the corresponding X/OPEN standard exist and many compliant implementations of the corresponding OMG standard are on its way or have been released recently.

Another known ACP is the so-called Three-Phase-Commit protocol.

The expressive power of a "classic" transaction just consisting of a single atomic activity is quite limited. Many situations exist in which more flexible means of control would be required than classical transaction provide. Especially for real-world applications collections of transactions, called a global transaction, do have to cooperate to achieve a desired processing goal.

For such complex transactions various different models have been developed. Examples are savepoint techniques, nested transactions, chained transactions and so on. An overview of different models can be found for instance in "J. Gray, A. Reuter, Transaction Processing: Concepts and Techniques, Morgan Kaufmann Publishers, San Francisco (Calif.)".

All these transaction models do have fundamental problems when considered alone as a vehicle to ensure atomicity for a collection of local or distributed transactions, i.e. for global transactions. The common source for these problems is the difficulty to find a proper balance between atomicity on one side and concurrency on the other side. Preventing to jeopardize the integrity of the overall application on one hand would mean to increase the number of locks held until the end of the global transaction; this would result in a tremendous increase in coordination control effort for assuring atomicity thus creating, especially in distributed processing environments, at the same time performance degradation and a serious loss in concurrency. On the other hand according the current state of the art reductions in the coordination control effort and improvements in performance and concurrency are accompanied by integrity jeopardies.

The chained transaction model for global transactions ensures that the encompassed transactions within the collection of transactions finally will succeed. This result is achieved without assuming that the collection of transactions is encompassed in a 2PC processing thus avoiding certain of above mentioned problems.

According transaction chaining, one can commit one, i.e. a first transaction, releasing all the objects that are no longer needed, and pass the processing context that is still required to the next, i.e. second transaction that is implicitly started. The commitment of the first transaction and the beginning of the next transaction are wrapped together in one atomic operation. This, in turn, means that no other transaction can have seen (or altered) any of the context data that is passed from one transaction to the other.

The disadvantage of the chained transaction model is due to its inherent asynchronous mode of processing: the first transaction just "kicks off" a request of processing of the second transaction without synchronously returning any information whether the second transaction has been started already and without any information on the outcome of its processing. By its very definition of a chained transaction it will make sure that finally all encompassed transactions will receive their service request but not within a guaranteed time frame. Thus, while providing a concept of a unit of work such a unit of work is often in contrast to what users' (both, end users as well as programmers) consider this unit of work to be. Implementing a notion of a unit of work which is more understandable (e.g. having a joint maximum duration) is cumbersome.

SUMMARY OF THE INVENTION

The invention is based on the objective to process a collection of a multitude of potentially distributed transactions ensuring transactional behavior for this collection, i.e. ensuring its atomicity. Besides offering atomic processing behavior it is an objective at the same time to optimize the communication traffic for the coordination of said transactions and further it is an objective at the same time to optimize the concurrency behavior and throughput of said collection of transactions.

The objective of the invention is solved by claim 1. The fundamental approach of the current invention for the processing of a collection of potentially distributed transactions encompassed by a global transaction is based on the approach to split the collection of member transactions into groups of transactions. Each of the groups is called a transactional stratum or stratum for short. Each stratum is processed and synchronized via an atomic-commit-protocol, thus guaranteeing an ACID processing outcome for each individual stratum. The global transaction, hence structured as a resulting collection of groups of transactions, i.e. as collection of strata, is processed as a set of chained strata according the principles of chained transaction processing. The chained strata execution guarantees an atomic execution of the global transaction.

The technique proposed by the current invention significantly reduces the coordination and synchronization effort inherently required to provide transactional behavior to a collection of member transactions. Processing intensive coordination and synchronization effort via atomic-commit-protocols is required only for a rather small number of member transactions belonging to the same stratum (compared to the potentially large number of member transactions being part of the overall global transaction). Only for such a rather small group of member transaction the processing burden for ensuring ACIDicity is required.

Moreover, splitting the global transaction into multiple strata will result in an increased concurrency behavior and throughput of the overall environment. This is because each stratum contains fewer transactions coordinated via 2PC, thus fewer locks are held per stratum. Furthermore, each stratum commits "independently" from the other strata concurrently active reducing the time needed until locks can be freed. Or stated in a nutshell, stratified transaction processing reduces granularity and thus increases concurrency and system throughput.

A stratum approach allows to realize new concepts of a "unit of work", as those member transactions forming a stratum may be viewed, due to their ACIDicity guaranteed outcome, as a unit of work. For instance the units of work could be defined with respect to interaction with the users. A stratum which was initiated by the user's request can return immediately after committing without having to wait until the successful completion of the other strata spawned by it. As a result, the user response time will be faster, in general.

Due to the chained processing of strata according the concepts of chained transaction processing atomicity of the collection of transactions is insured hence providing a transaction behavior of the global transaction.

Additional advantages are accomplished by claim 2. According to a further embodiment of the proposed invention the processing activities for chaining a first and a second transactional stratum are part of the first and the second transactional stratum. According the current invention the chaining of the strata is achieved by inserting and retrieving respectively an execution request from a queue.

A handling of these execution requests as part of a stratum allows the handling to participate in the ACIDicity operation insuring that at the point in time of committing a stratum the execution request handling has been successfully completed.

Additional advantages are accomplished by claim 3. This further embodiment of the proposed invention teaches a queue supporting asynchronous transaction processing; i.e. after inserting a transaction execution request into the queue, control is returned to the inserting activity not waiting for the requested transaction to start or to finish its processing.

Asynchronous transaction processing significantly reduces response time which is significant especially if user interaction is concerned.

Additional advantages are accomplished by claim 4. According to a further embodiment of the proposed invention said queue is representing a durable-protected-resource managed by a resource-manager.

A queue being a protected resource guarantees that a transaction execution request once successfully inserted into the queue will always be remembered by the system even across system crashes and alike. Finally due to this technique atomicity not only of a single stratum but also of the whole global transaction is assured.

Additional advantages are accomplished by allowing each member transaction and therefore allowing each stratum to be processed anywhere within an arbitrary large and complex computer network; accordingly a member transaction as well as a stratum may be distributed across a multitude of computer systems.

Additional advantages are accomplished by allowing a multitude of different policies to define the member transactions processed within a stratum. Hence complete freedom is offered for the selection of those member transactions assembling the individual strata.

For instance according to one policy member transactions, which are to be executed on the same computer system, are combined to form an individual transactional stratum. Such a policy allows to reduce the network traffic required to coordinate a collection of potentially distributed transactions. As all member transactions to be processed on one and the same physical machine together with an instance of the required transaction manager could be processed within one transactional stratum, this will avoid sending the messages needed to comply with the 2PC across machine boundaries enhancing the performance of the coordination process per stratum.

For a fuller understanding of the present invention, reference should be made to the following detailed description taken in conjunction with the accompanying drawings.

BRIEF DESCRIPTION OF THE DRAWINGS

FIG. 1 is a diagram reflecting the overall structure of a transaction program in pseudo-code;

DETAILED DESCRIPTION OF THE INVENTION

Introduction

If the current specification is referring to a transaction this is no limitation to a local or distributed transaction. Typically according this specification a transaction may be of any of these types.

As already outlined, a transaction, also called a transactional application, comprises a sequence of operations that changes recoverable resources and data such as a database from one consistent state into another. A transaction processing system guarantees that if a transaction executes some updates against recoverable resources and data, and if a failure occurs before the transaction reaches its normal termination or an interim point of consistency, then those updates will be undone (roll-back). When a new point of consistency has been reached and all updates made by the transaction must be made permanent, the transaction is committed.

FIG. 1 gives a short outline on the overall structure of a transaction program in a pseudo-code representation. Of course a transaction application program can be written in any conventional or specialized programming language. The transaction application program declares the start of a new transaction by invoking BEGIN_WORK( ) in line 1. Thereafter all operations performed by the program will be part of this transaction. Also, all operations performed by other programs in service of the transaction application program (within the program scope of line 2–3) will be part of the transaction. The program declares the transaction to be a complete and correction transformation of the system state by invoking COMMIT_WORK( ) in line 5 of FIG. 1. Once the transaction successfully commits, the transaction's effects are durable and persistent. If something goes wrong in the transaction, the transaction application can undo all the operations by invoking ROLLBACK_WORK( ) in line 7. If there is a failure during the transaction's execution, the system can unilaterally cause the transaction to be rolled back. BEGIN-COMMIT or BEGIN-ROLLBACK, then, are used to bracket the ACID transformations.

Figure 2:
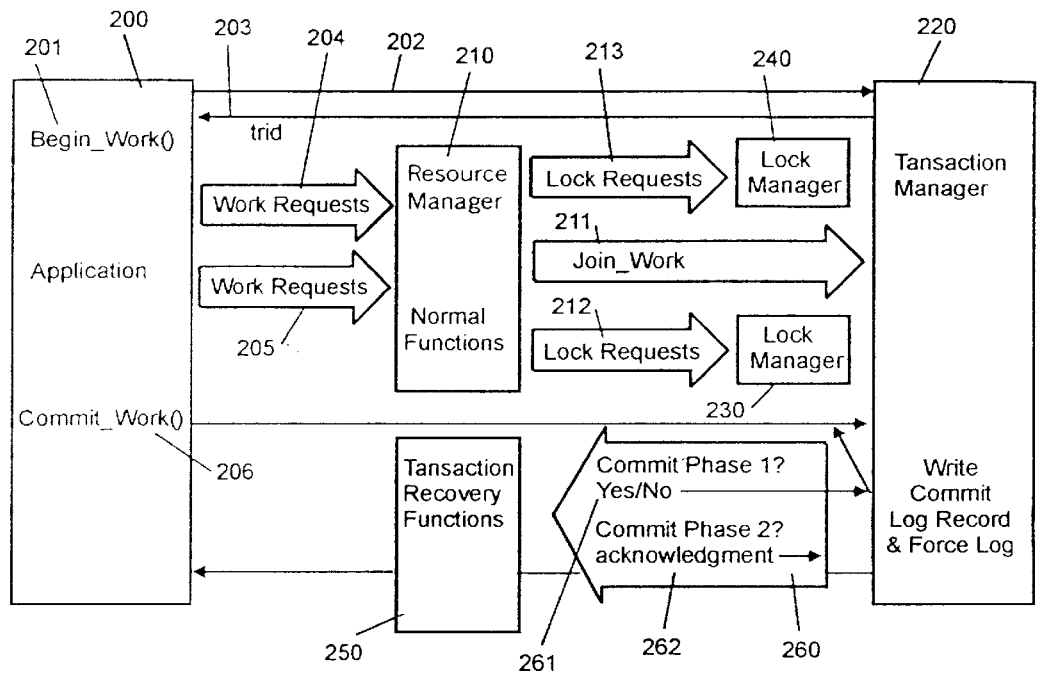
FIG. 2 visualizes the basic control flow of a transactional application and the major components within a transaction processing system.

The basic control flow of a transactional application and the major components within a transaction processing system are visualized in FIG. 2. FIG. 2 depicts

- the transaction program 200;
- one of a potential multitude of resource managers 210, a resource managers being a subsystem that manages some transactional objects of a certain type. The resource manager typically offers services to applications or other resource managers, which might be available in the overall system;
- the transaction manager 220, which orchestrates the commit and rollback of transactions as well as the recovery of objects, resources, resource managers or local or remote sites after they fail;
- the log manager 230, which records a log of changes made by the transaction, so that a consistent version of all objects and resources can be reconstructed in case of failure;
- a lock manager 240, which provides a generic mechanism to regulate concurrent access to objects and resource, helping the resource managers to provide transaction isolation;
- the transaction recovery functions 250, activated in case of failures within the commit scope of the transaction program.

According to FIG. 2 the BEGIN_WORK( ) verb 201 starts the transaction, registering it 202 with the transaction manager and creating a unique transaction identifier (trid) 203. Once the application has started a transaction, it can begin to invoke resource managers 204 to 205, reading and writing databases, sending requests to local and remote sites or manipulating any other type of resource.

When a resource manager 210 gets the first request associated with that transaction, it joins 211 the transaction, telling the local transaction manager 220 that it want's to participate in the transactions's commitment and rollback operations. It is typical for several resource managers to join the transaction. As these resource managers perform work on behalf of the transactions, they keep lists of changes they have made to objects. As a rule, they record both the old and the new value of an object or resource. The transaction processing system provides a logging service 212 to record these changes. The log manager 230 efficiently implements a sequential file of all the updates of transaction to objects and resources. Of course, the resource managers have to tell the log manager what these updates are.

To provide isolation, resource managers lock 213 the objects and resources accessed by the transaction; this prevents other transactions from seeing the uncommitted updates of this transaction and prevents them from altering the data read or written by this uncommitted transaction. The transaction processing system provides a lock manager 240 that other resource managers can use.

When the transaction 200 issues COMMIT_WORK( ) 206, the transaction manager performs an atomic commit protocol, i.e. in the current case a two-phase-commit-protocol 260. First, it queries all resource managers that joined the transaction, asking 261 if they think the transaction is a consistent and complete transformation. Any resource manager can vote no 262, in which case the commit fails. But if all the resource managers vote yes 262, then the transaction is a correct transformation, and the transaction manager records this fact in the log, informing each resource manager that the transaction is complete. At this point, the resource managers can release the locks and perform any other operations needed to complete the transaction. If the transaction should fail during execution, or if a resource manager votes no during phase 1 of the 2PC, then the transaction manager orchestrates transaction roll-back. In this case, the transaction manager reads the transaction's log and, for each log record, invokes the resource manager that wrote the log record, asking the resource manger to undo the operation. Once the undo scan is complete, the transaction manager invokes each resource manager that joined the transaction and tells it that the transaction was aborted.

The transaction manager also orchestrates transaction recovery if a node or site fails. It provides generic services for the failure of a single object, the failure of a resource manager, and the failure of an entire site. In the following offers a sketch of how the transaction manager helps in system recover.

After a site fails, the transaction processing (TP) system restarts all resource managers. Several transactions may have been in progress at the time of the failure. The resource managers contact the transaction manager as part of their restart logic. At that time, the transaction manager informs them about the outcome of each transaction that was active at the time of the failure. Some may have committed, some may have aborted, and some still may be in the progress of committing. The resource manager can recover its committed state independently, or it can participate in the transaction manager's undo and redo scan of the log.

If a resource manager fails but the rest of the TP system continues operating, the transaction manager aborts all transactions involved with that resource manager. When the resource manager returns to service, the transaction manager informs the resource manager about the outcome of those transactions. The resource manager can use this information and the transaction log to reconstruct its state.

If a particular object is lost but the resource manager is otherwise operational, then the resource manager can continue to offer service on other objects while the failed object is reconstructed from an archive copy and from a log of all committed changes to that copy. The transaction manager and the log manager aid recovery from an archive copy of the object.

Each site usually has a separate transaction manager. This allows each site to operate independently of the others, providing local autonomy. When the transaction's execution is distributed among several sites, it is distributed among several transactions managers. In that case the 2PC protocol is used within multiple transaction managers.

Resources, also called transactional objects, maintained and controlled by a resource manager are protected resources or recoverable resources. Actions targeted against protected resources do not externalize their results before they are completely done. Their updates are commitment controlled, they can roll-back if anything goes wrong before a normal end, and once they have reached their normal end, there will be no unilateral roll-back. Thus actions targeted at protected resources have the ACID property.

Figure 3:
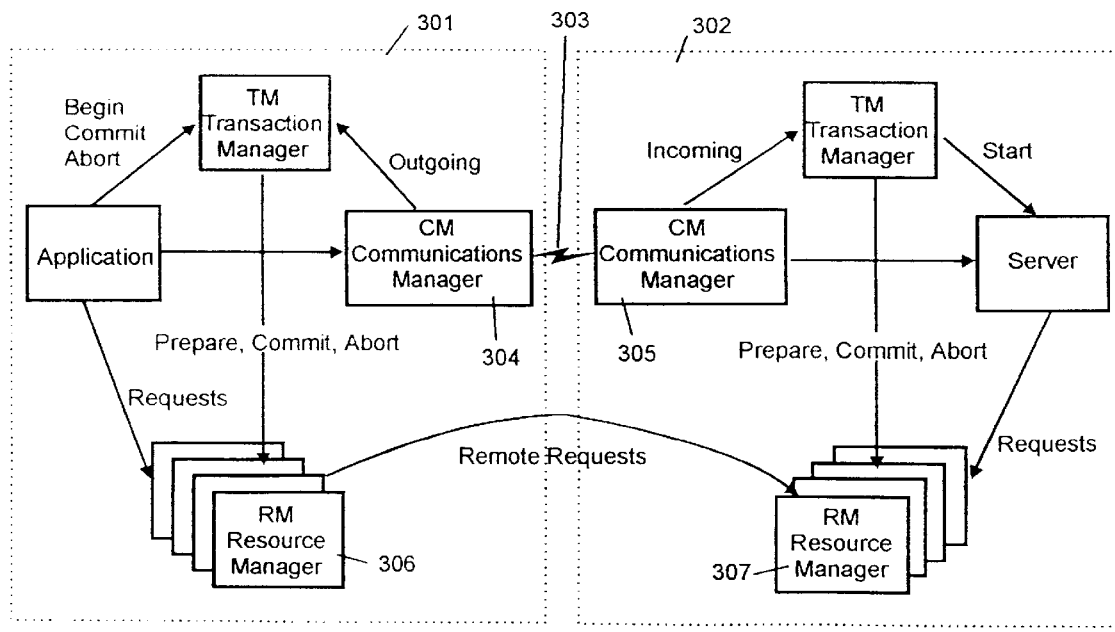
FIG. 3 is a visualization of the distributed transaction model.

FIG. 3 visualizes a TP system more focussing on the aspects of distributed TP systems. Furthermore some variants compared to the model outlined in FIG. 2 are portrayed. The model of FIG. 3 is along the lines of the X/OPEN consortium point of view.

FIG. 3 reflects two TP systems 301 and 302 connected via some computer network 303. Both TP systems encompass a specific resource manager responsible for the communication in between them, the communication managers 304 and 305. Moreover in this model it is assumed that each resource manager 306 and 307 has a private log and a private lock manager. It is presumed that the resource managers performs its own roll-back, based on a single roll-back call from the transaction manager, in case the transaction aborts.

Global Transactions

The expressive power of a "classic" transaction just consisting of a single atomic activity is quite limited. Many situations exist in which more flexible means of control would be required than classical transaction provide. Especially for real-world applications collections of transactions do have to cooperate to achieve a desired processing goal. Such a collection of classical ACID transactions is called a global transaction if its atomicity is ensured.

From computer science mechanisms are known to ensure atomicity of global transactions. One approach to deal with the problem of global transactions are so-called chained transactions. Chained transactions offer a particular approach to reduce to a certain extend the processing effort associated with synchronous Atomic Commit Protocols (ACP) for assuring ACIDicity.

Suppose that CT is a chained transaction consisting of the classic member transactions T1 to Tn. The concept of chained transactions allows to impose a sequential substructure upon the long running global transaction CT. The concept allows to issue from within a member transaction Ti a transaction processing request of member transaction Tj by a CHAIN execution request. Two variants of chained transactions are possible. According the synchronous chained transaction model the commitment of member transaction Ti synchronously results in the execution of the chained transaction Tj. In an asynchronous chained transaction model on the other hand commitment of member transaction Ti will be followed by a asynchronous execution of the chained transaction Tj.

In the following we will not distinguish between these different expressions of the chained transaction principle if not explicitly necessary.

A potential execution context bound to the processing of Ti, for example such as a database context encompassing database cursors and so forth, may be preserved and passed over to the processing of Tj. Thus with transaction chaining, one can commit one transaction Ti, release all the resources and objects that are no longer needed, and pass on the processing context that is still required to the next transaction Tj that is implicitly started by the TP processing system. The commitment of the first transaction Ti and the beginning of the next transaction Tj are wrapped together into one atomic operation. This in turn means, that no other transaction can have seen or altered any of the context data that is passed from one transaction Ti to the other Tj.

Since the chaining step irreversibly completes a transaction (Ti), rollback is limited to the currently active member transaction (Tj) within the chained transaction CT. The commit of Ti allows the transaction application CT to free locks that it does not later need. Restart handling according the chained transaction scheme is executed by reestablishing the state of the most recent commit, i.e. the commit of the most recently committed member transaction.

When chaining within a member transaction Ti the next member transaction Tj this processing request is inserted, as part of the commit scope of the calling transaction Ti, into a request queue. This request queue is of course a recoverable, i.e. durable, resource and the insertion operation fulfills the ACIDicity requirements. A multitude of these recoverable request queues thus support persistent recoverable messaging. Taking the processing request of the next member transaction Tj out of the queue is part of the commit scope of Tj.

If the process of chaining within CT from a member transaction Ti the next member transaction Tj is asynchronous in nature, these asynchronous transaction processing requests do not result in a processing of the next member transaction Tj at once. Instead the processing request is inserted, as part of the commit scope of the calling transaction Ti, into a request queue. It is left to the TP system when this processing request will result in the execution of the requested next member transaction Tj.

Figure 4:
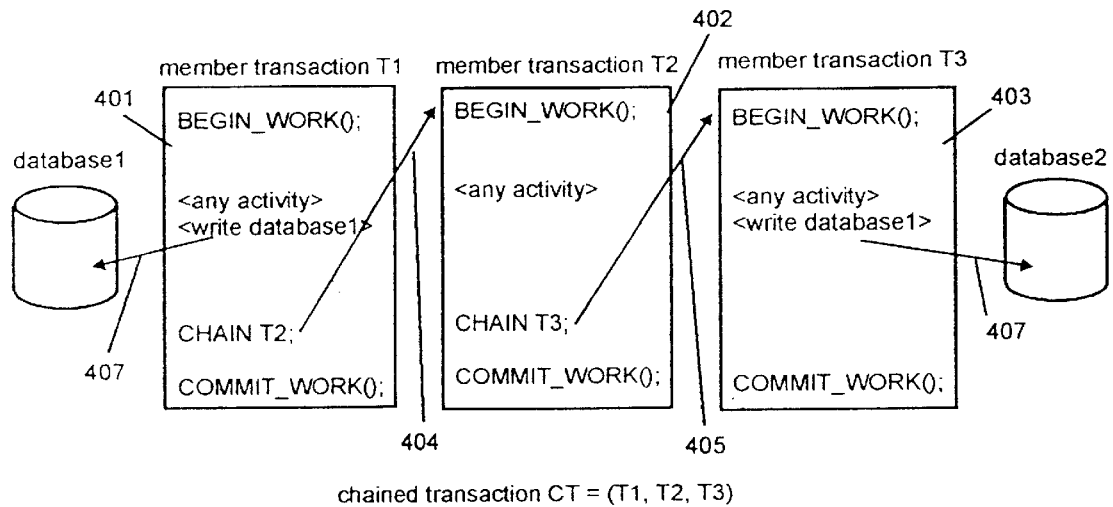
FIG. 4 is a diagram reflecting a simple example of a chained transaction.

FIG. 4 is a diagram reflecting a simple example of a chained transaction CT encompassing the member transaction T1, T2, T3, i.e. 401, 402, 403. Within its commit scope T1 executes certain activities, for which ACIDicity is guaranteed; the access 407 of a particular database is one example. Also within its commit scope, i.e. before commit its work, T1 issues 404 the execution request of the next member transaction T2 being part of the chained transaction CT. Once member transaction T2 gets control it analogously performs the activities it is responsible for. At a certain point in time it issues 405 the execution request of the last member transaction T3 being part of the chained transaction CT. According the current example member transaction T3 after getting control accesses 406 a further database within its commit scope.

The current invention is also dealing with the case that the transactions are distributed within a network. As such this invention is also related to the area of distributed transaction processing. This means that each of the member transactions might run in a separate thread or process of the hosting operating system or on a different physical machine in a network. Therefore, conceptually it is no longer required to distinguish on which computer system in the network a certain transaction is going to be processed.

With the advent of Message Oriented Middleware (MOM) for communication purposes between computer systems within a network new concepts for processing of distributed transaction became possible. In the last few years Message Oriented Middleware (MOM) increased its importance. With MQSeries IBM set a de-facto standard in this area which is currently reflected by work undergoing in public standardization bodies like ISO and OMG mainly adopting MQSeries' protocols. With respect to IBM's MQSeries refer for instance to "MQSeries Planning Guide, Document Number GC33-1349-01". Message oriented middleware provides persistent recoverable queues which are treated as recoverable resources in the sense of protected resources controlled by a resource manager, i.e. manipulating such queues can be done within transactions guaranteeing ACIDicity support for the handling of the message queues.

Figure 5:
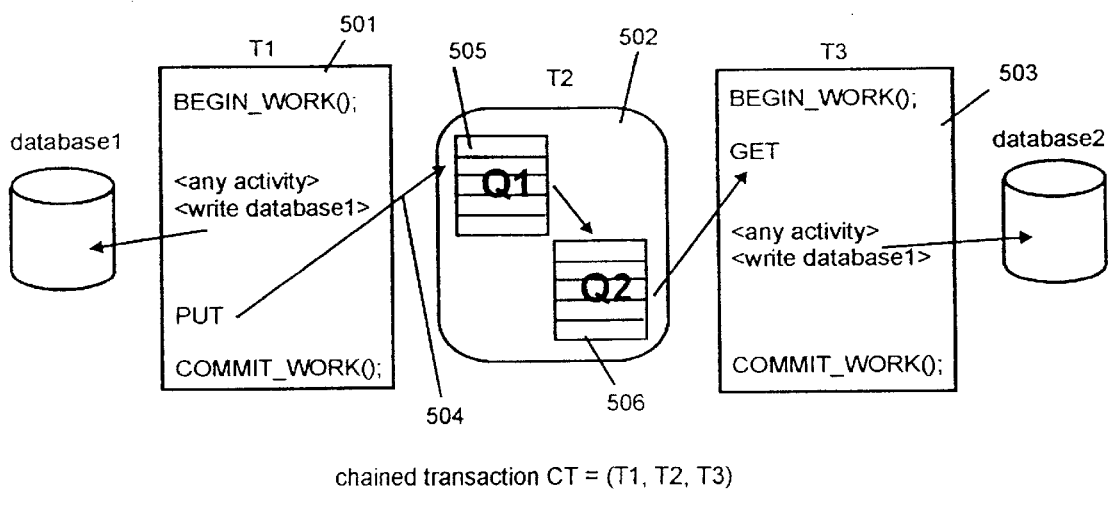
FIG. 5 depicts an example of how MOM can be exploited to process distributed global transaction according to the chained transaction model.

FIG. 5 depicts an example of how MOM can be exploited to process distributed global transaction according to the chained transaction model. Exploitation of MOM allows for an asynchronous protocol to ensure the same outcome of two chained transactions: Assuming a transaction application is split into two member transactions T1 501 and T3 503, and T1 and T3 must both take place (i.e. commit) in order to result in a semantically correct execution of the associated distributed application. In this case, T1 has to manipulate its subject recoverable resources within the same local transaction than it put 504 a message to start T3 in its local persistent recoverable queue Q1 505. The delivery of the message from Q1 to Q2 506 (a queue local to T3) is ensured by the exploited messaging middleware layer and may thus be perceived as a third, independent transaction T2 502. T3 in turn has to get this request from its local queue Q2 within the same local transaction than it manipulated its subject recoverable resources. As a consequence, if T1 commits its work T3 will successfully perform the related work, finally.

Global transactions processed according the current state of the art do have fundamental problems to ensure atomicity of a collection of potentially distributed transactions.

A distributed transaction application, of example, may consist of two or more semantically related threads of execution each of which is running somewhere in a network. Here the notion of a thread is used in its most general sense as the OS representation of a piece of code in execution and not as in the strict sense of an operating system's unit of dispatching or swapping. When a subset of this collection of threads consists of transactions the outcome of these transactions must be synchronized. Usually it must be ensured that either all the participating transactions commit or all are aborted.

While being a solution of this atomicity problem the 2PC, as one representative of the family of ACP protocols being synchronous protocols allowing collections of transactions to reach the same transactional outcome (i.e. either commit or abort), has some well-known drawbacks: For example, decreased concurrency within the overall system due to locks held until the end of the global transaction, or the high message complexity inherent to the 2PC resulting in a reduction of the performance of the overall environment.

These disadvantages result in many cases in implementations which avoid the exploitation of the 2PC. The consequence is that the integrity of the overall application is jeopardized. In case of crashes overall consistency has to be re-established in many situations via manual actions which is cumbersome and often error-prone.

On the first sight the chained transaction processing scheme could be an alternative. The chained transaction model ensures that the encompassed transactions finally succeed. It does so without assuming that the collection of transactions is encompassed in 2PC processing thus avoiding the above mentioned problems.

The disadvantage of the chained transaction model is based on being asynchronous: By its very definition it will make sure that finally all encompassed member transactions will receive their service request, but not within a guaranteed timeframe. Thus, while providing the concept of a unit of work such a unit is often in contrast to what users' (both, end users as well as programmers) consider this unit of work to be. Implementing a notion of a unit of work which is more understandable (e.g. having a joint maximum duration) is cumbersome.

Moreover the chained transaction model suffers the deficiency from delivering the full ACIDicity functionality to the chained transaction in total. ACIDicity is available to individual member transaction only.

Stratified Global Transactions

The fundamental concept of the current invention for the processing of a collection of potentially distributed transactions encompassed by a global transaction is based on the following techniques:

the collection of transactions is split into groups of transactions; each of the groups is called a transactional stratum or stratum for short;

each stratum is processed and synchronized via an ACP (e.g. 2PC) protocol, thus guaranteeing an ACID processing outcome for each individual stratum;

the global transaction structured as a resulting collection of groups of transactions, i.e. as collection of strata, is processed as a set of chained strata according the principles of chained transactions; chained strata execution guarantees an atomic execution of the global transaction.

The approach to process the global transaction encompassing a collection of member transactions partitioned into strata, i.e. into groups, is based on the observation that in many practical situations it is not necessary, that all participating transactions reach by default their end synchronously. What is still vital is that all participants reach the same decisions, i.e. either to commit or abort. In this situation it is not necessary that the outcome of all participating transactions is synchronized via a 2PC.

Moreover the partitioning process of the global transaction into a collection of strata can take place according different policies. For instance a partitioning example could be, to group those transactions processed on the same TP system of the network within the same stratum; an approach significantly reducing the distributed synchronization effort via the ACP. According another partitioning policy those member transactions are processed within the same stratum, which effect the most critical recoverable resources. In general the collection of participating transactions is partitioned into groups of directly collaborating transactions the transactional outcome of which must be synchronized via an ACP (e.g. to meet the exploiter's perception of a unit of work).

From an exploiter's perspective the structure of a stratum is invisible, i.e. it is simply perceived as a "monolithic" transaction. A set of participating transactions running on the same physical machine, or a set of participating transactions performing a unit of work directly perceived by an end user are natural candidates for strata.

The transactional dependency between strata is that if the transactions within one stratum jointly committed, then the other strata must commit too. This situation can be frequently observed when groups of collaborating transactions (i.e. strata) require services from other groups of collaborating transactions (i.e. strata). The transactional outcome of each individual stratum is managed via a 2PC. This approach assures ACIDicity to the processing of each stratum. The set of strata itself is managed as a collection of chained transactions (in the sense of chained transaction as outline above) and thus is called an asynchronous transaction bundle or chained strata. The chaining approach for the processing of the asynchronous transaction bundle guarantees atomicity.

Asynchronous transaction bundles rely for their implementation on persistent recoverable messaging. Such a persistent recoverable queue might be part of the TP system or may be facilitated by a underlying messaging middleware. MQSeries is one example of a persistent recoverable queue which might be used. For this purpose each stratum participating in an asynchronous transaction bundle manipulates its recoverable resources to perform its proper business function as if it were a standalone transaction. In addition to this, each transaction within a stratum is responsible to put messages into persistent recoverable queues of the underlying messaging layer to request services from transactions in other strata which the former transaction must be sure to be performed for the semantical success of the encompassing distributed application. To achieve atomicity it is crucial that the act of putting these requests into the queues must take place as part of each proper transaction. In turn for the same reasons, each transaction within a stratum which is started by a queued request must make sure that getting the request itself is part of its proper transaction. As a consequence, all "puts" and "gets" performed by transactions within a stratum will be committed if and only if the encompassing stratum commits.

When a collection of potentially distributed transactions is grouped into strata and the set of strata is structured as a bundle of asynchronous transactions we call the resulting transaction model a stratified transaction.

In order to allow "put" as well as "get" to participate in the proper transaction the underlying queuing implementation must act as a resource manager itself. Especially, it must participate in a ACP (e.g. 2PC) protocol. Furthermore, the transportation mechanism of the queuing implementation must be transacted in the sense that once the queuing system committed a "put" into a queue its delivery must be ensured.

Network traffic required for coordinating a collection of distributed transactions can be reduced by restricting participants of a 2PC to run all on one and the same physical machine. This means, that all transactions associated with a particular stratum (ideally) run on the same machine. Of course, a certain machine or TP system may be the host of multiple strata. The consistent outcome of the overall stratified transaction is achieved by exploiting the chained transaction model to coordinate the strata itself as participating transactions.

Figure 6:
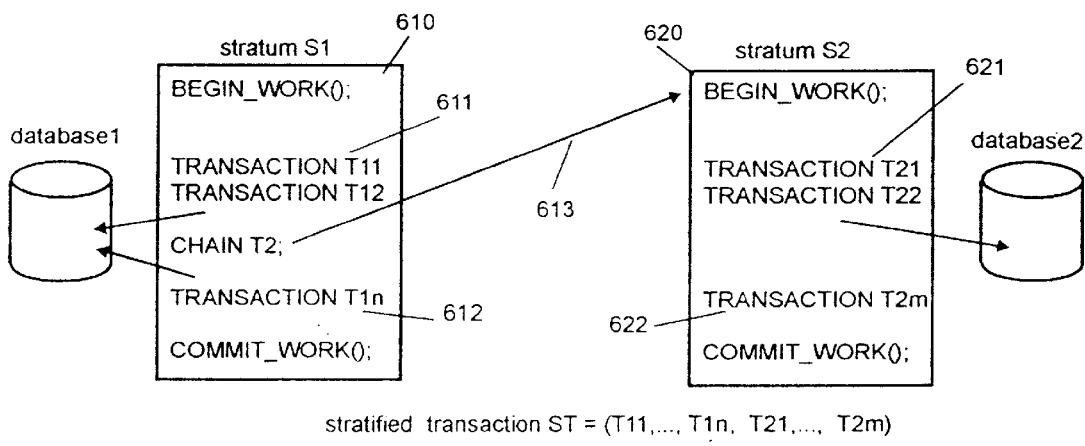
FIG. 6 is a diagram reflecting a simple example of a stratified transaction according the current invention.

FIG. 6 depicts an example of a simple stratified transaction ST split (according any type of policy) into the two transactional strata S1 610 and S2 620. Stratum S1 encompasses the "n" member transactions T11 611 to T1n 612 processed within S1's commit scope and thus guaranteeing ACIDicity to the outcome of stratum S1. Through a chaining mechanism 613 on stratum level as part of S1's commit scope S1 issues asynchronous processing of stratum S2. Once stratum S2 gets control and starts processing, its "m" member transactions T21 621 to T2m 622 are going to be processes in S2's commit scope assuring ACIDicity.

According the description above only within the groups of member transactions T11 to T1n and T21 to T2m an ACP protocol synchronizes the processing outcome.

Figure 7:
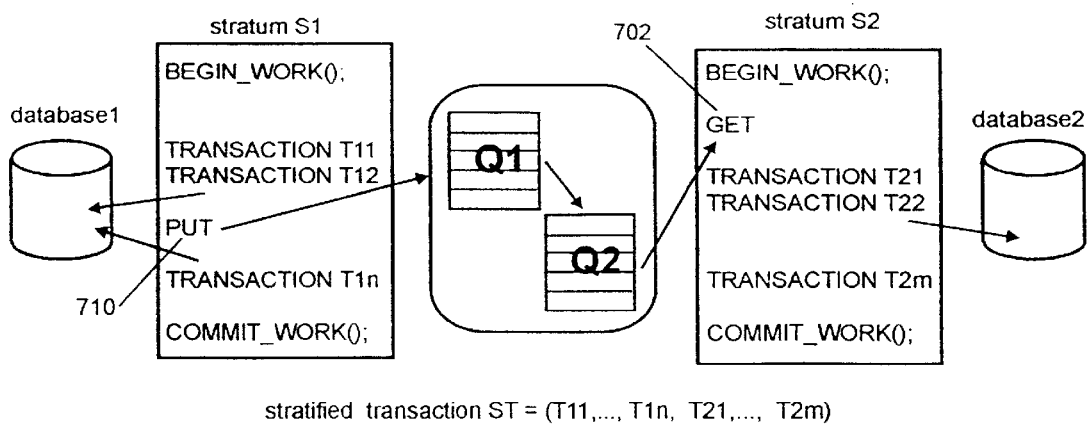
FIG. 7 is a diagram reflecting a simple example of a stratified transaction according the current invention using the MOM for chaining the individual transactional strata.

FIG. 7 depicts the case of FIG. 6 but now using the MOM for chaining the individual transactional strata. Within stratum S1 a further stratum S2 is started by inserting via a "put" 701 a processing request of stratum S2. In order to result in a semantically correct execution of the distributed stratified transaction ST, S1 has to manipulate its subject recoverable resources within S1's commit scope. Insertion of the message to start S2 in its local persistent recoverable queue is therefore part of S1's commit scope. The delivery of the message from Q1 to Q2 is ensured by the exploited messaging middleware layer. S2 in turn has to "get" 702 this request from its local queue Q2 within the commit scope of S2.

Figure 8:
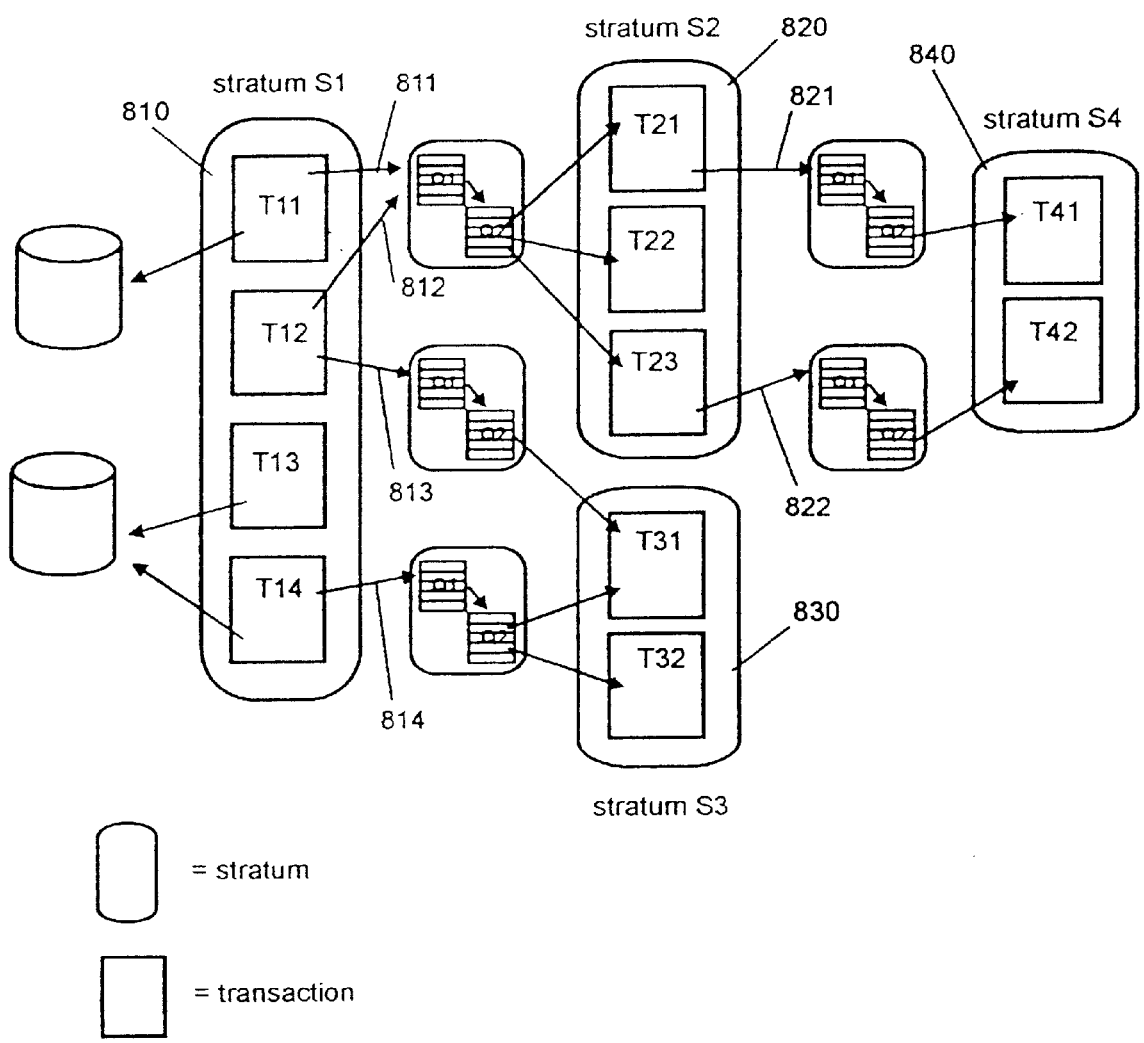
FIG. 8 is a diagram reflecting a more complex example of a stratified transaction according the current invention with a multitude of transactional strata.

FIG. 8 finally visualizes a more complex stratified transaction according the current invention. The global transaction of this example is split up into 4 transactional strata S1 810, S2 820, S3 830, S4 840. Each of the transactional strata comprising within its commit scope a collection of member transactions. By inserting messages into the protected messages queues member transaction T11 requests 811 processing of stratum S2, member transaction T12 requests 812, 813 processing of stratum S2 and S3 and further member transaction T14 requests processing of stratum S3. Moreover, during processing of transactional stratum S2 member transaction T21 requests 821 processing of stratum S4 and member transaction T23 requests 822 processing of stratum S4.

Advantages

Transaction stratification allows to reduce the network traffic required to coordinate a collection of potentially distributed transactions. This is achieved by grouping the member transactions encompassed with a particular stratum according various policies. For example according one grouping policy all member transactions to be processed on one and the same physical machine together with an instance of the required transaction manager could be processed within one transactional stratum. This will avoid sending the messages needed to comply with the 2PC across machine boundaries enhancing the performance of the coordination process per stratum.

Splitting the global transaction into multiple strata will result in an increased concurrency behavior and throughput of the overall environment. This is because each stratum contains fewer transactions coordinated via 2PC and due to the reduced number of transactions within each stratum fewer locks are held per stratum. Furthermore, each stratum commits "independently" from the other strata concurrently active reducing the time needed until locks can be freed.

The user response time will be faster, in general. This is because the stratum which was initiated by the user's request can return immediately after committing without having to wait until the successful completion of the other strata spawned by it.

The increasing adaptation of both, the network centric computing paradigm and the object request broker paradigm, will result in a proliferation of transactions. These transactions will provide discrete services which have to be combined into applications. This combination must often ensure a coordinated outcome of the encompassed transactions. The current invention provides this by having the outlined benefits when compared with the current state-of-the-art mechanisms.

Thus, implementers of distributed applications within the above paradigms striving towards tuning the performance of their applications without jeopardizing semantical consistency are candidates for exploiting the current teachings.

Acronyms

2PC Two-Phase-Commit Protocol
ACP Atomic Commit Protocol
ISO International Standard Organization
MOM Message Oriented Middleware
OMG Object Management Group
TM Transaction Manager
TP Transaction Processing While the preferred embodiments of the present invention have been illustrated in detail, it should be apparent that modifications and adaptations to those embodiments may occur to one skilled in the art without departing from the scope of the present invention as set forth in the following claims.

We claim:

1. The method for transaction processing of a collection of potentially distributed transactions encompassed by a global transaction, the collection of potentially distributed transactions organized into groups of transactions called strata, to provide and ACIDicity function through an atomic-commit-protocol to application programs for application program defined commit-scopes, comprising the steps of:

processing, in a first processing step, a first transactional stratum, said stratum comprising as a member thereof at least one of said transactions, with a commit-scope guaranteeing ACIDicity of the processing results through said atomic-commit-protocol;

inserting a transaction-execution-request into a queue, said transaction-execution-request requesting processing of a second transactional stratum, said second transactional stratum comprising as a member thereof at least another of said transactions; and retrieving said transaction-execution-request from said queue and processing, in a second processing step chained in accordance with the concepts of chained transactions with said first processing step, said second step being processed only if said first-transactional-stratum successfully commits its processing, said second transactional stratum having a commit-scope guaranteeing ACIDicity of the processing results through said atomic-commit-protocol.

2. The method for transaction processing of claim 1, wherein:

said step of inserting said transaction-execution-request into said queue is part of said commit-scope of said first transactional stratum; and said step of retrieving said transaction-execution-request from said queue is part of said commit-scope of said second-transactional-stratum.

3. The method for transaction processing of claim 1, for use with asynchronous-transaction-processing, wherein said queue is distributed across different computer systems interconnected for asynchronous-transaction-processing, wherein:

said step of inserting said transaction-execution-request into said queue is asynchronous, returning control to said system of said first processing step without waiting for completion of said retrieving and second processing step.

4. The method for transaction processing of claim 1, wherein said queue is a durable-protected-resource managed by a resource manager, wherein:

said step of inserting said transaction-execution-request into said queue additionally comprises logging said transaction-execution-request for reconstruction in case of failure.

5. The method for transaction processing of claim 1 across a computer network, wherein:

said member transactions or parts of said member transactions comprising said first transactional stratum and/ or said second transactional stratum are processed by ones of a plurality of computer systems connected by said computer network.

6. The method for transaction processing of claim 1, wherein:

said atomic-commit-protocol is implemented as a two-phase-commit protocol or as a three-phase-commit protocol.

7. The method for transaction processing of claim 1 employing a plurality of processing policies, wherein:

each of said transactional strata processing steps is capable of being processed by a different processing policy.

8. The method for transaction processing of claim 7, wherein:

a local node processing policy defines all member transactions to be processed within the same transactional stratum, which are to be executed on the same computer system.

9. The method for transaction processing of a collection of potentially distributed transactions encompassed by a global transaction, the collection of potentially distributed transactions organized into groups of transactions called strata, to provide and ACIDicity function through an atomic-commit-protocol to application programs for application program defined commit-scopes, comprising the steps of:

grouping said transactions into transactional strata, each said stratum having at least one of said transactions as a member thereof;

processing in a first processing step, a first of said transactional strata with a commit-scope guaranteeing ACIDicity of the processing results through said atomic-commit-protocol;

inserting a transaction-execution-request into a queue, said transaction-execution-request requesting processing of a second of said transactional strata;

retrieving said transaction-execution-request from said queue; and processing, in a second processing step chained, in accordance with the concepts of chained transactions, with said first processing step, said second step being processed only if said first-transactional-stratum successfully commits its processing, said second transactional stratum having a commit-scope guaranteeing ACIDicity of the processing results through said atomic-commit-protocol.

10. A computer system multi-node network for transaction processing of a collection of potentially distributed transactions encompassed by a global transaction to provide and ACIDicity function through an atomic-commit-protocol to application programs for application program defined commit-scopes, comprising:

a database in each of at least two computer system nodes of said multi-node network storing in one node a first transactional stratum comprising at least one member transaction of said transactions, and in another node a second transactional stratum comprising at least one other member transaction of said transactions;

a transaction manager in one of said at least two computer system nodes, said transaction manager for said one node processing said member transaction of said first transactional stratum with a commit-scope guaranteeing ACIDicity of the processing results through said atomic-commit-protocol and inserting a transaction-execution-request into a queue, said transaction-execution-request requesting processing of a second of said transactional strata; and a transaction manager in a second of said at least two computer system nodes, said transaction manager for said second node retrieving said transaction-execution-request from said queue and processing said member transaction of said second transactional stratum, in accordance with the concepts of chained transactions, chained with said first transactional stratum, said second stratum being processed only if said first-transactional-stratum successfully commits its processing, said second transactional stratum processed with a commit-scope guaranteeing ACIDicity of the processing results through said atomic-commit-protocol.

11. The computer system multi-node network of claim 10, additionally comprising:

resource managers for each of said at least two computer system nodes, each managing a queue associated with said one of said transaction managers to lock the objects and resources accessed by said transaction managers until said member transactions of said strata are committed, wherein said transaction-execution-request requesting processing of a second of said transactional strata is inserted in said queue of said resource manager of said second of at least two computer system nodes.

12. A computer program product for operating a computer system network for transaction processing of a collection of potentially distributed transactions encompassed by a global transaction, the collection of potentially distributed transactions organized into groups of transactions called strata, to provide and ACIDicity function through an atomic-commit-protocol to application programs for application program defined commit-scopes, said computer program product comprising a storage medium having computer-readable program code embodied in said medium for causing the computer system network to:

conduct a first processing step at one node of said computer system network, processing a first transactional stratum, said stratum comprising as a member thereof at least one of said transactions, with a commit-scope guaranteeing ACIDicity of the processing results through said atomic-commit-protocol;

insert a transaction-execution-request into a queue, said transaction-execution-request requesting processing of a second transactional stratum, said second transactional stratum comprising as a member thereof at least another of said transactions;

retrieve said transaction-execution-request from said queue; and conduct, in a second processing step, chained in accordance with the concepts of chained transactions with said first processing step, said second step being processed only if said first-transactional-stratum successfully commits its processing, processing of said second transactional stratum with a commit-scope guaranteeing ACIDicity of the processing results through said atomic-commit-protocol.

13. The computer program product of claim 12, wherein:

said insertion of said transaction-execution-request into said queue is part of said commit-scope of said first transactional stratum; and said retrieval of said transaction-execution-request from said queue is part of said commit-scope of said second-transactional-stratum.

* * * * *